(12) United States Patent
Park et al.

(10) Patent No.: US 11,647,568 B2
(45) Date of Patent: May 9, 2023

(54) HEATING DEVICE USING HYPER HEAT ACCELERATOR AND METHOD FOR MANUFACTURING THE SAME

(71) Applicant: IM ADVANCED MATERIALS CO., LTD, Gyeonggi-do (KR)

(72) Inventors: Ji Hun Park, Seoul (KR); Seung Yeon Lee, Gyeonggi-do (KR); Seong Hwan Lim, Gyeonggi-do (KR); Yeo Jo Yoon, Gyeonggi-do (KR); Hye Jin Kim, Gyeonggi-do (KR)

(73) Assignee: IM ADVANCED MATERIALS CO., LTD., Gyeonggi-Do (KR)

( * ) Notice: Subject to any disclaimer, the term of this patent is extended or adjusted under 35 U.S.C. 154(b) by 292 days.

(21) Appl. No.: 15/995,903

(22) Filed: Jun. 1, 2018

(65) Prior Publication Data

US 2019/0320504 A1    Oct. 17, 2019

(30) Foreign Application Priority Data

Apr. 12, 2018    (KR) .......................... 10-2018-0042904

(51) Int. Cl.
*F24C 15/32*    (2006.01)
*F24C 15/20*    (2006.01)
(Continued)

(52) U.S. Cl.
CPC ............... *H05B 3/86* (2013.01); *H04N 23/52* (2023.01); *H04N 23/57* (2023.01); *H05B 3/141* (2013.01); *H05B 3/16* (2013.01); *H05B 2214/02* (2013.01)

(58) Field of Classification Search
CPC .. H04N 5/2257; H04N 5/22521; H05B 3/141; H05B 3/16; H05B 3/86;
(Continued)

(56) References Cited

U.S. PATENT DOCUMENTS 3,710,074 A * 1/1973 Stewart .................. E06B 3/6715
219/203
4,623,582 A * 11/1986 Hasegawa ............... C03C 17/36
428/209
(Continued)

FOREIGN PATENT DOCUMENTS

CN    1033949 A    7/1989
CN    1864266 A    11/2006
(Continued)

OTHER PUBLICATIONS

European Search Report for EP 18177082.7 dated Mar. 20, 2019 (7 pages).
(Continued)

*Primary Examiner* — Eric S Stapleton
(74) *Attorney, Agent, or Firm* — Dilworth & Barrese, LLP.; Michael J. Musella, Esq.

(57) ABSTRACT

Disclosed is a heating device, including a substrate, a metal oxide layer formed on the substrate, hyper heat accelerator dots having a spherical shape formed on the metal oxide layer and arranged in a lattice form, and a conductive adhesive layer formed on the metal oxide layer and the hyper heat accelerator dots, wherein the lower portions of the hyper heat accelerator dots having a spherical shape are included in the metal oxide layer and the upper portions thereof are included in the conductive adhesive layer.

7 Claims, 9 Drawing Sheets

(51) Int. Cl.
*H05B 3/86* (2006.01)
*H05B 3/14* (2006.01)
*H05B 3/16* (2006.01)
*H04N 23/52* (2023.01)
*H04N 23/57* (2023.01)

(58) Field of Classification Search
CPC ... H05B 3/84; H05B 2214/02; H01M 10/052; H01M 6/168; H01M 10/0567; H01M 4/5835; H01M 4/583; H01M 4/525; H01M 10/0525; H01M 4/387; H01M 4/621; H01M 4/366; Y02E 60/10; C22B 25/04; C23C 13/00
USPC .................................. 219/553; 429/188, 341
See application file for complete search history.

(56) References Cited

U.S. PATENT DOCUMENTS

| | | | | |
|---|---|---|---|---|
| 4,654,510 A * | 3/1987 | Umeya | H01C 1/1406 | 219/541 |
| 4,724,159 A * | 2/1988 | Yamazaki | C23C 16/452 | 136/256 |
| 4,908,330 A * | 3/1990 | Arai | C23C 16/452 | 117/103 |
| 4,920,254 A * | 4/1990 | DeCamp | B64C 1/1492 | 219/203 |
| 4,922,024 A * | 5/1990 | Bowman | C07C 209/16 | 544/358 |
| 4,941,929 A * | 7/1990 | Tecle | B23K 35/3612 | 148/24 |
| 5,069,968 A * | 12/1991 | Nietering | C03C 17/3639 | 428/336 |
| 5,229,205 A * | 7/1993 | Nietering | C03C 17/3639 | 428/336 |
| 5,506,037 A * | 4/1996 | Termath | B32B 17/10174 | 359/360 |
| 5,580,493 A * | 12/1996 | Chu | H01M 10/425 | 252/511 |
| 5,705,272 A * | 1/1998 | Taniguchi | G03G 15/2064 | 219/548 |
| 5,780,313 A * | 7/1998 | Yamazaki | C23C 16/511 | 118/719 |
| 5,908,799 A * | 6/1999 | Kobayashi | H01L 23/15 | 501/98.4 |
| 5,918,795 A * | 7/1999 | Yamaguchi | B23K 35/262 | 228/200 |
| 5,935,340 A * | 8/1999 | Xia | B08B 7/0035 | 134/1.1 |
| 6,204,480 B1 * | 3/2001 | Woodard | B32B 7/12 | 219/203 |
| 6,268,594 B1 * | 7/2001 | Leutner | H05B 3/84 | 219/205 |
| 6,625,875 B2 * | 9/2003 | Sol | B32B 17/10174 | 29/621 |
| 8,492,737 B2 * | 7/2013 | Araci | B82Y 20/00 | 250/504 R |
| 8,658,309 B2 * | 2/2014 | Yazami | H01M 10/052 | 429/188 |
| 8,881,317 B2 * | 11/2014 | Tokunaga | H05B 3/84 | 4/237 |
| 9,085,051 B2 * | 7/2015 | Alvarez | B23K 35/36 | |
| 9,755,229 B2 * | 9/2017 | Wang | C22B 25/04 | |
| 10,022,709 B2 * | 7/2018 | Roman-Leshkov | B01J 27/24 | |
| 2001/0050019 A1 * | 12/2001 | Ezaki | G03G 15/2064 | 101/488 |
| 2002/0011477 A1 * | 1/2002 | Jones | H05B 3/146 | 219/219 |
| 2002/0182451 A1 * | 12/2002 | Smith | H01L 39/2451 | 428/699 |
| 2005/0035421 A1 * | 2/2005 | Kayanuma | H04N 5/2253 | 257/432 |
| 2005/0067681 A1 * | 3/2005 | De Villeneuve | H01L 23/04 | 257/678 |
| 2005/0072974 A1 * | 4/2005 | Nakamura | H01L 27/1292 | 257/59 |
| 2005/0112291 A1 * | 5/2005 | Okajima | H05B 3/84 | 427/447 |
| 2005/0236708 A1 * | 10/2005 | Farnworth | H01L 27/14685 | 257/723 |
| 2006/0154425 A1 * | 7/2006 | Yang | H01L 29/7833 | 438/287 |
| 2007/0111094 A1 * | 5/2007 | Thackeray | H01M 4/38 | 429/218.1 |
| 2007/0223913 A1 * | 9/2007 | Lee | H04N 5/2253 | 396/529 |
| 2007/0272827 A1 * | 11/2007 | Heo | H01L 27/14618 | 250/208.1 |
| 2008/0252760 A1 * | 10/2008 | Wu | H01L 27/14618 | 348/294 |
| 2008/0252771 A1 * | 10/2008 | Wu | H04N 5/2254 | 348/340 |
| 2009/0025131 A1 * | 1/2009 | Yamamoto | A47K 13/305 | 4/420 |
| 2009/0115891 A1 * | 5/2009 | Ryu | H05K 1/0218 | 348/374 |
| 2009/0130791 A1 * | 5/2009 | Kwon | H04N 5/2252 | 438/65 |
| 2009/0152658 A1 * | 6/2009 | Bol | H01L 27/14625 | 257/432 |
| 2009/0321863 A1 * | 12/2009 | Borthakur | H01L 21/6835 | 257/432 |
| 2009/0324902 A1 * | 12/2009 | Tokunaga | G03C 1/853 | 428/195.1 |
| 2010/0095443 A1 * | 4/2010 | Nishimura | H05B 3/267 | 4/237 |
| 2010/0119942 A1 * | 5/2010 | Kumar | H01M 4/38 | 429/220 |
| 2010/0123409 A1 * | 5/2010 | Hsieh | H05B 41/14 | 315/248 |
| 2010/0231766 A1 * | 9/2010 | Moriya | H04N 5/2253 | 348/294 |
| 2010/0258343 A1 * | 10/2010 | Hsu | H05K 1/0218 | 174/350 |
| 2011/0017726 A1 * | 1/2011 | Choi | C03C 17/34 | 219/552 |
| 2011/0017727 A1 * | 1/2011 | Choi | C03C 17/04 | 219/552 |
| 2011/0089160 A1 * | 4/2011 | Kuriki | H05B 3/84 | 219/553 |
| 2011/0233481 A1 * | 9/2011 | Alvarez | B23K 35/36 | 252/514 |
| 2011/0261242 A1 * | 10/2011 | Izutani | H04N 5/2257 | 348/308 |
| 2011/0285890 A1 * | 11/2011 | Choi | H04N 5/2257 | 348/308 |
| 2011/0305605 A1 * | 12/2011 | Jaeger | B01J 19/02 | 422/241 |
| 2012/0044411 A1 * | 2/2012 | Wang | H04N 5/2257 | 348/374 |
| 2012/0080421 A1 * | 4/2012 | Macher | H05B 3/84 | 219/522 |
| 2012/0230670 A1 * | 9/2012 | Hirooka | H01L 27/14683 | 396/529 |
| 2012/0276951 A1 * | 11/2012 | Webster | H04N 5/2257 | 455/556.1 |
| 2013/0020303 A1 * | 1/2013 | Kim | H05B 3/84 | 219/203 |
| 2013/0074252 A1 * | 3/2013 | Tokunaga | H05B 3/04 | 4/237 |
| 2013/0153559 A1 * | 6/2013 | Choi | H05B 3/84 | 219/203 |
| 2013/0161309 A1 * | 6/2013 | Lisinski | B32B 17/10376 | 219/203 |
| 2013/0175255 A1 * | 7/2013 | Kim | H05B 3/84 | 219/522 |
| 2013/0213949 A1 * | 8/2013 | Lisinski | H01R 43/00 | 219/203 |

(56) References Cited

U.S. PATENT DOCUMENTS

| | | | |
|---|---|---|---|
| 2013/0327757 A1* | 12/2013 | Kim | H05B 3/86 219/203 |
| 2014/0227551 A1* | 8/2014 | Rateiczak | B32B 17/1022 428/615 |
| 2014/0376202 A1* | 12/2014 | Shibutani | H05K 3/3436 361/767 |
| 2015/0004490 A1* | 1/2015 | Wang | C22B 25/04 429/220 |
| 2015/0105241 A1* | 4/2015 | Roman-Leshkov | H01M 4/583 502/177 |
| 2015/0232067 A1* | 8/2015 | Schall | H05B 3/86 219/203 |
| 2015/0327334 A1* | 11/2015 | Choi | H05B 3/86 219/203 |
| 2016/0165667 A1* | 6/2016 | Choi | H05B 3/10 219/553 |
| 2016/0311402 A1* | 10/2016 | Suetsugu | B60S 1/586 |
| 2017/0223779 A1* | 8/2017 | Suetsugu | H01C 17/003 |
| 2017/0238373 A1* | 8/2017 | Kim | H05B 3/84 219/203 |
| 2017/0353996 A1* | 12/2017 | Lee | H05B 3/20 |
| 2018/0338352 A1* | 11/2018 | Torita | H05B 3/14 |
| 2021/0032775 A1* | 2/2021 | Gopinath | C40B 40/06 |

FOREIGN PATENT DOCUMENTS

| | | |
|---|---|---|
| CN | 101036418 A | 9/2007 |
| CN | 102278043 A | 12/2011 |
| CN | 104284956 A | 1/2015 |
| CN | 104801879 A | 7/2015 |
| CN | 104822187 A | 8/2015 |
| CN | 105190370 A | 12/2015 |
| CN | 105556618 A | 5/2016 |
| JP | 2005281726 A | 10/2005 |
| JP | 2008141037 A | 6/2008 |
| JP | 2010153963 A | 7/2010 |
| JP | 2011066560 A | 3/2011 |
| JP | 2015135932 A | 7/2015 |
| JP | 2015182334 A | 10/2015 |
| JP | 2017517893 A | 6/2017 |
| KR | 20170021088 A | 2/2017 |
| RU | 2232448 C2 | 7/2004 |
| WO | 2004047421 A2 | 6/2004 |
| WO | 2006022743 A2 | 3/2006 |
| WO | 2014097943 A1 | 6/2014 |
| WO | 2017205658 A1 | 11/2017 |

OTHER PUBLICATIONS

Notice of Allowance dated Mar. 31, 2020 of Japanese Patent Application No. 2018-109715.
Search Report dated Aug. 10, 2021 in corresponding Chinese Patent Application No. 201810580256.

* cited by examiner

HEATING DEVICE USING HYPER HEAT ACCELERATOR AND METHOD FOR MANUFACTURING THE SAME

CROSS-REFERENCE TO RELATED APPLICATION

This application claims the benefit of Korean Patent Application No. 10-2018-0042904, filed Apr. 12, 2018, entitled "Heating device using hyper heat accelerator and method for manufacturing the same", which is hereby incorporated by reference in its entirety into this application.

BACKGROUND OF THE DISCLOSURE

Technical Field

The present disclosure relates to a hyper heat accelerator, a heating device using a hyper heat accelerator and a method of manufacturing the same.

Description of the Related Art

Recently, compact camera modules have been broadly used in various industrial fields. In particular, compact camera modules are widely utilized in fields of IT and automobile industries, such as those of smartphones, tablet PCs, game machines, CCTVs, and the like.

A camera module widely used in various industrial fields is configured to include a lens on which external light is incident, an image sensor module that converts light incident from the lens into a digital image or a moving image, and a housing that accommodates the lens and the image sensor.

The lens of the camera module is usually exposed to the outside in order to receive external light. When the lens of the camera module is exposed to the outside in this way, the outer side or inner side of the lens may become damp due to a difference between the external temperature of the camera module and the internal temperature of the camera module, or condensation may form thereon in the winter.

In the case where the lens of the camera module becomes damp or is subjected to condensation, light passing through the lens is distorted due to dampness or condensation and is then incident on the image sensor, and thus the quality of the image or moving image may significantly deteriorate.

With the goal of solving the above problems, there are required techniques for preventing the dampness and condensation of the lens from occurring.

In order to prevent frost or condensation from forming on a lens and to protect the lens from freezing, winding a hot wire around a camera module or disposing a hot wire therein has been disclosed in the conventional art (Korean Patent Application Publication No. 2017-0021088 A). However, a long period of time is required to elevate the temperature of the lens to a desired level in order to prevent the frost, condensation and freezing of the lens from occurring simply by using the hot wire.

In particular, when the external temperature is extremely low, it takes a long time to elevate the temperature of the lens to a desired level. On the contrary, when heat is generated from the hot wire under the condition that the external temperature is high or the temperature of the camera module is high, there is the risk of fire of the camera module.

CITATION LIST

Patent Literature (Patent Document 1) Korean Patent Application Publication No. 2017-0021088 A

SUMMARY OF THE DISCLOSURE

Accordingly, a first aspect of the present disclosure is to provide a hyper heat accelerator for a heating device.

A second aspect of the present disclosure is to provide a heating device capable of removing dampness or frost in a short time using a hyper heat accelerator.

A third aspect of the present disclosure is to provide a method of manufacturing a heating device.

Therefore, an embodiment of the present disclosure for accomplishing the first aspect provides a hyper heat accelerator for a heating device, selected from the group consisting of $SnF_2$, $SnF_4$, tin nickel fluoride (SnNiF), tin chromium fluoride (SnCrF), tin zinc fluoride (SnZnF), zinc nickel fluoride (ZnNiF) and combinations thereof.

In an exemplary embodiment, the hyper heat accelerator may be hyper heat accelerator dots having a spherical shape and a diameter of 50 to 100 nm, which may be arranged in a lattice form on the heating device.

In an exemplary embodiment, the hyper heat accelerator dots may be arranged at an interval of 10 to 20 nm.

An embodiment of the present disclosure for accomplishing the second aspect provides a heating device, comprising a substrate, a metal oxide layer formed on the substrate, hyper heat accelerator dots having a spherical shape formed on the metal oxide layer and arranged in a lattice form, and a conductive adhesive layer formed on the metal oxide layer and the hyper heat accelerator dots, wherein the lower portions of the hyper heat accelerator dots having a spherical shape are included in the metal oxide layer and the upper portions thereof are included in the conductive adhesive layer.

In an exemplary embodiment, the hyper heat accelerator may be selected from the group consisting of $SnF_2$, $SnF_4$, tin nickel fluoride (SnNiF), tin chromium fluoride (SnCrF), tin zinc fluoride (SnZnF), zinc nickel fluoride (ZnNiF) and combinations thereof.

In an exemplary embodiment, the hyper heat accelerator dots may have a diameter of 50 to 100 nm and may be arranged at an interval of 10 to 20 nm.

In an exemplary embodiment, the metal oxide may be selected from the group consisting of aluminum oxide, copper oxide, iron oxide, tin oxide, cadmium oxide, zinc oxide and combinations thereof.

In an exemplary embodiment, the conductive adhesive may be an optically clear adhesive.

An embodiment of the present disclosure for accomplishing the third aspect provides a method of manufacturing a heating device, comprising forming a metal oxide layer on a first substrate, forming hyper heat accelerator dots having a spherical shape in a lattice arrangement through a continuous room-temperature chemical process on a conductive adhesive layer of a second substrate, and passing the second substrate having the hyper heat accelerator dots having a spherical shape formed thereon and the first substrate having the metal oxide layer formed thereon through a roller, whereby the hyper heat accelerator dots having a spherical shape are attached via lamination to the metal oxide layer of the first substrate while remaining attached to the conductive adhesive layer of the second substrate, wherein the lower portions of the hyper heat accelerator dots having a spherical shape are included in the metal oxide layer and the upper portions thereof are included in the conductive adhesive layer.

In an exemplary embodiment, the continuous room-temperature chemical process may include guiding microwaves generated from a microwave generator to a magnetic field formation space, introducing a plasma source gas into the magnetic field formation space, maintaining the plasma source gas in the magnetic field formation space in a plasma state through exposure to the microwaves, maintaining plasma having high energy density through ECR (Electro Cyclotron Resonance) of electrons and ions in the plasma under a magnetic field, feeding a hyper heat accelerator source gas for forming a deposition film into the plasma region having high energy density to give activated ions, and continuously forming hyper heat accelerator dots through instant surface chemical reaction of the activated ions on the surface of the second substrate.

In an exemplary embodiment, the hyper heat accelerator dots may have a diameter of 50 to 100 nm and may be arranged at an interval of 10 to 20 nm.

In an exemplary embodiment, the hyper heat accelerator may be selected from the group consisting of $SnF_2$, $SnF_4$, SnNiF, SnCrF, SnZnF, ZnNiF and combinations thereof.

In an exemplary embodiment, the metal oxide may be selected from the group consisting of aluminum oxide, copper oxide, iron oxide, tin oxide, cadmium oxide, zinc oxide and combinations thereof.

In an exemplary embodiment, the conductive adhesive may be an optically clear adhesive.

In an exemplary embodiment, the method may further include, after the forming the hyper heat accelerator dots in a lattice arrangement, forming a protective film on the hyper heat accelerator dots having a spherical shape and removing the protective film from the hyper heat accelerator dots.

The heating device according to the present disclosure can have an extended heat range, a fast heating time and a high maximum temperature, using a hyper heat accelerator, in lieu of indium.

The method of manufacturing the heating device according to the present disclosure is simple and economical because a hyper heat accelerator is formed on a metal oxide layer using a continuous room-temperature chemical process and a lamination attachment process.

DESCRIPTION OF THE REFERENCE NUMERALS OF THE DRAWINGS

10: electrode
11: hyper heat accelerator
12: conductive adhesive

DESCRIPTION OF SPECIFIC EMBODIMENTS

Before the present disclosure is described in more detail, it must be noted that the terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept implied by a term to best describe the method he or she knows for carrying out the disclosure. Therefore, the examples described in the present specification are merely preferred embodiments of the present disclosure, and do not represent all of the technical ideas of the present disclosure, and thus it is to be understood that a variety of equivalents and modifications able to substitute therefor may be provided at the point in time at which the present disclosure is filed.

Hereinafter, preferred embodiments of the present disclosure will be described in detail so that those skilled in the art to which the present disclosure belongs can easily carry out the present disclosure. Furthermore, in the following description, it is to be noted that, when known techniques related with the present disclosure may make the gist of the present disclosure unclear, a detailed description thereof will be omitted.

Figure 1A:
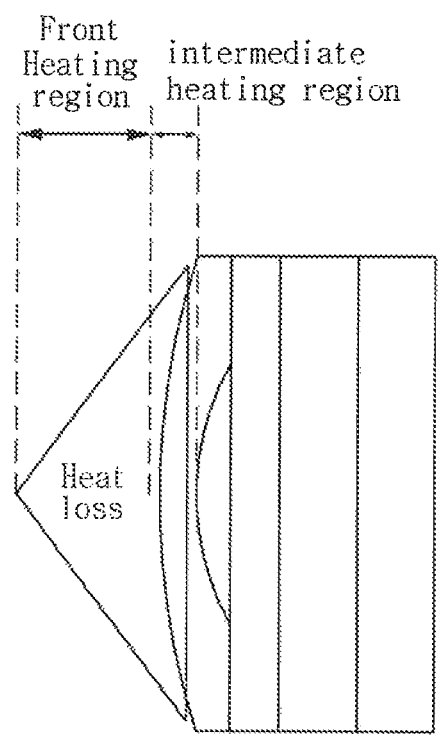
FIGS. 1A and 1B are cross-sectional views showing a conventional heating device and a heating device according to an embodiment of the present disclosure.
Figure 1B:
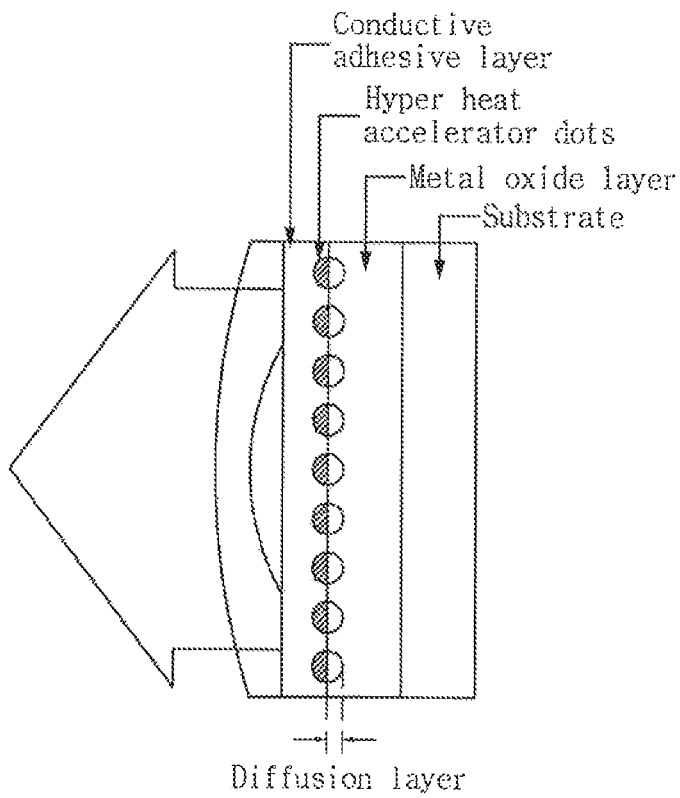

FIG. 1A is a cross-sectional view showing a conventional heating device, and FIG. 1B is a cross-sectional view showing a heating device according to an embodiment of the present disclosure.

With reference to FIG. 1B, the heating device includes a substrate, a metal oxide layer formed on the substrate, hyper heat accelerator dots having a spherical shape formed on the metal oxide layer and arranged in a lattice form, and a conductive adhesive layer formed on the metal oxide layer and the hyper heat accelerator dots, in which the lower portions of the hyper heat accelerator dots having a spherical shape may be included in the metal oxide layer and the upper portions thereof may be included in the conductive adhesive layer.

The substrate is a plastic substrate having insulating properties, and is made of a material having electrical insulating properties and thermal insulating properties in order to prevent power and heat applied to the heating device from escaping to the outside. Examples of the material for a base substrate 30 include, but are not limited to, polyimide, polyethersulfone (PES), polyacrylate (PAR), polyetherimide (PEI), polyethylene naphthalate (PEN), polyethylene terephthalate (PET), polyphenylene sulfide (PPS), polyarylate, polycarbonate (PC), cellulose triacetate (CTA) and cellulose acetate propionate (CAP).

The metal oxide layer may be formed by depositing a metal oxide on the substrate. The deposition proceeds at room temperature, and a chemical vapor deposition process may be utilized. Specifically, the chemical vapor deposition process may be carried out in a manner in which overcondensed metal ions are formed by applying a voltage to a metal oxide precursor and the formed metal ions are deposited on the surface of the substrate through chemical bonding. Since the chemical vapor deposition process is performed at room temperature, deposition onto a polymer that has high functionality but is poorly resistant to heat becomes possible, and the above deposition process facilitates large-area deposition.

The metal oxide may be a metal oxide containing any one or a mixture of two or more selected from among aluminum (Al), copper (Cu), iron (Fe), tin (Sn), cadmium (Cd) and zinc (Zn). The metal oxide has electrical conductivity, and the metal oxide layer is able to generate heat through thermal energy. With regard to the heat generation of the heating device, the heat value of the metal oxide may be determined by the resistance, and a change in the temperature may be determined by the heat capacity of an object, which thus varies depending on the type of metal oxide. The metal oxides listed above have heat values suitable for a flat-type heater. In an exemplary embodiment, the metal oxide is tin oxide ($SnO_2$). For example, tin oxide is mainly used in the form of indium tin oxide, which is a mixture of indium oxide and tin oxide, but indium is not used in the present disclosure. The thickness and resistance of the metal oxide layer may be adjusted even without the use of indium, and moreover, a heat value suitable for use in a heating device may be obtained due to the hyper heat accelerator formed on the metal oxide layer, as will be described later.

The metal oxide layer may further include an additional functional material in addition to the metal oxide. In order to improve functionality related to the heat generation of the metal oxide layer, a metal oxide layer may be formed by mixing two or more metal oxides, but a metal oxide layer may also be formed by adding a non-metal material to the metal oxide. In an exemplary embodiment, the functional material may be fluorine. When fluorine is added to tin oxide, chemical resistance and high-temperature properties, as well as optical transmittance and electrical conductivity, may be improved.

The hyper heat accelerator may be at least one selected from the group consisting of $SnF_2$, $SnF_4$, tin nickel fluoride (SnNiF), tin chromium fluoride (SnCrF), tin zinc fluoride (SnZnF) and zinc nickel fluoride (ZnNiF).

With reference to FIG. 1B, in the heating device according to the present disclosure, the lower portions of the hyper heat accelerator dots are included in the metal oxide layer to thus form a diffusion layer, and the upper portions thereof are included in the conductive adhesive layer.

Figure 2A:
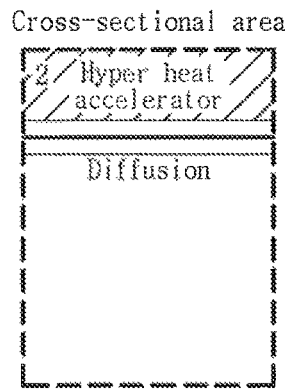
FIGS. 2A to 2C are cross-sectional views of hyper heat accelerator dots representing the principle of a hyper heat accelerator.
Figure 2B:
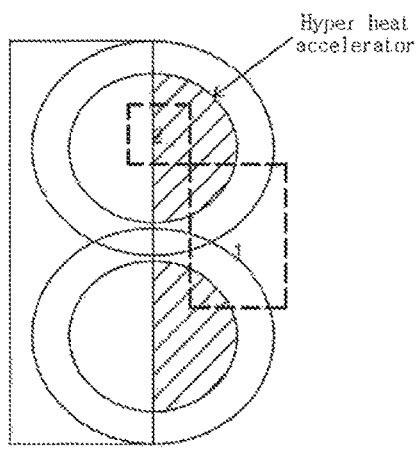
Figure 2C:
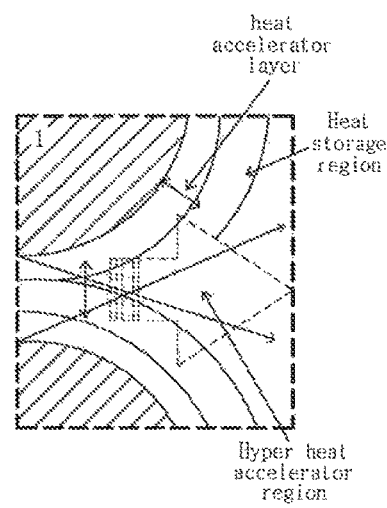

FIGS. 2A to 2C are cross-sectional views of hyper heat accelerator dots representing the principle of a hyper heat accelerator.

With reference to FIGS. 2A and 2B, the lower portions of the hyper heat accelerator dots are diffused into the metal oxide layer to give a diffusion layer. The diffusion of the hyper heat accelerator dots into the metal oxide layer is based on a lamination attachment process, as will be described later.

With reference to FIG. 2C, while heat generated from the hyper heat accelerator dots passes through a heat acceleration region and a heat storage region, the temperature is rapidly elevated and may be maintained for a long time through the extension of the heating range. The heat storage region generated by reinforcing the heat diffusion region of an existing heating layer (metal oxide layer) with the heat acceleration region due to the hyper heat accelerator may extend the heating range and enables the temperature to be elevated in a short time.

Figure 3:
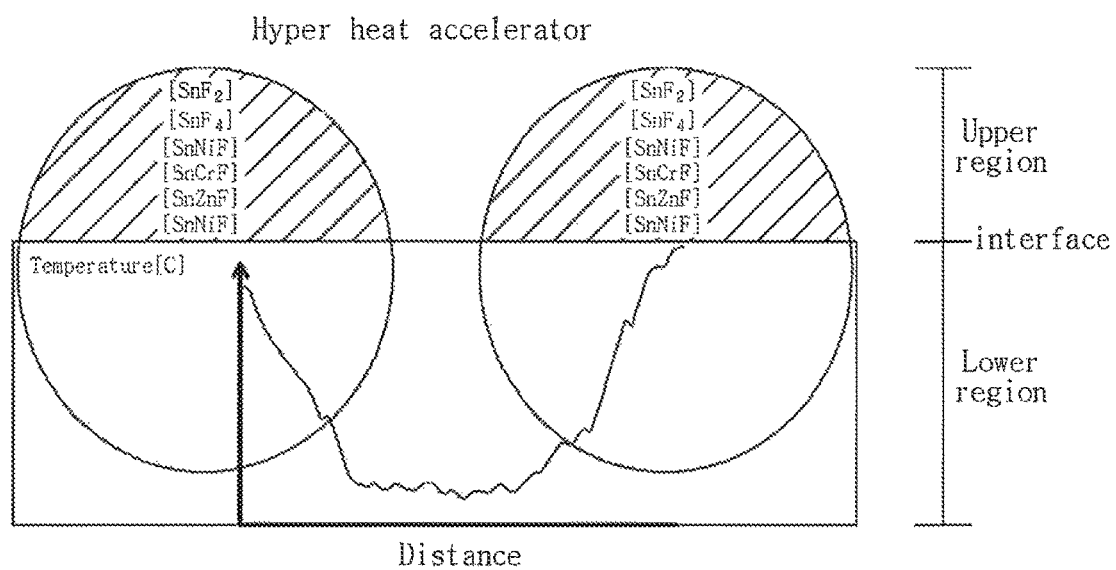
FIG. 3 shows the temperature gradient between hyper heat accelerator dots.

FIG. 3 shows the temperature gradient between the hyper heat accelerator dots. With reference to FIG. 3, in the lower region of the interface, a temperature difference occurs due to differences in heat permittivity and heat storage rate between the existing heating layer (metal oxide layer) region and the region in which the hyper heat accelerator dots are diffused. In the upper region of the interface, as shown in FIGS. 2A to 2C, a heat storage region may be generated due to the heat of the heat acceleration region.

Figure 4:
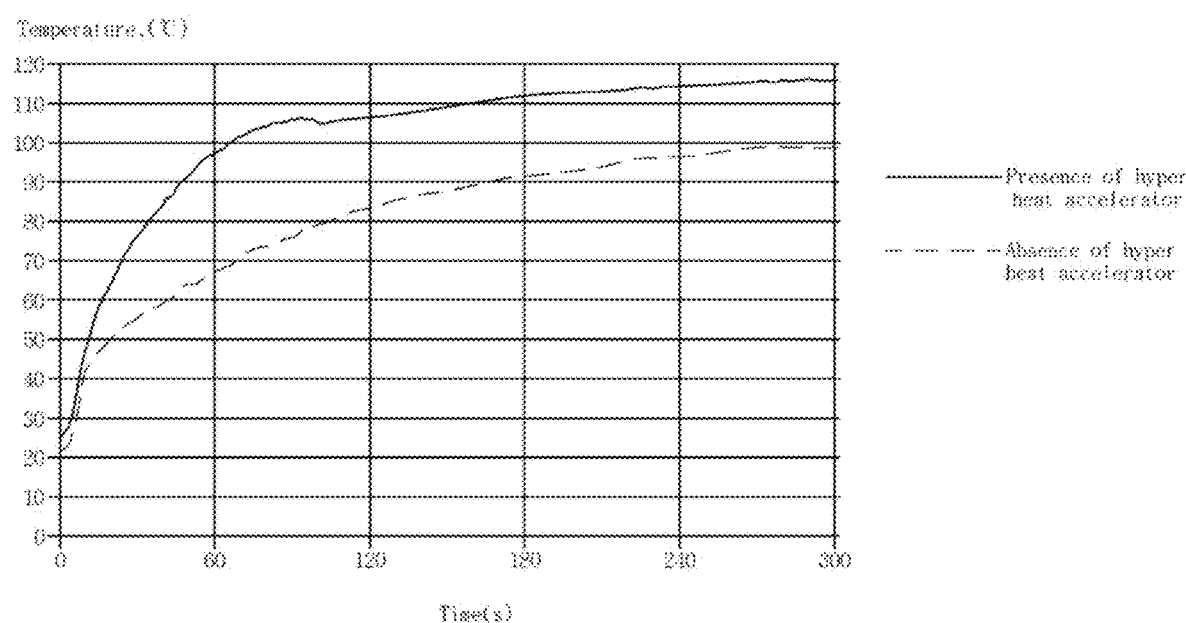
FIG. 4 is a graph showing the temperature elevation effect of a heating device having a hyper heat accelerator.

FIG. 4 is a graph showing the temperature elevation effect of a heating device having a hyper heat accelerator. According to the present disclosure, the heating device comprising hyper heat accelerator dots is able to reach a higher temperature in a shorter time than a heating device that does not include hyper heat accelerator dots.

Figure 5:
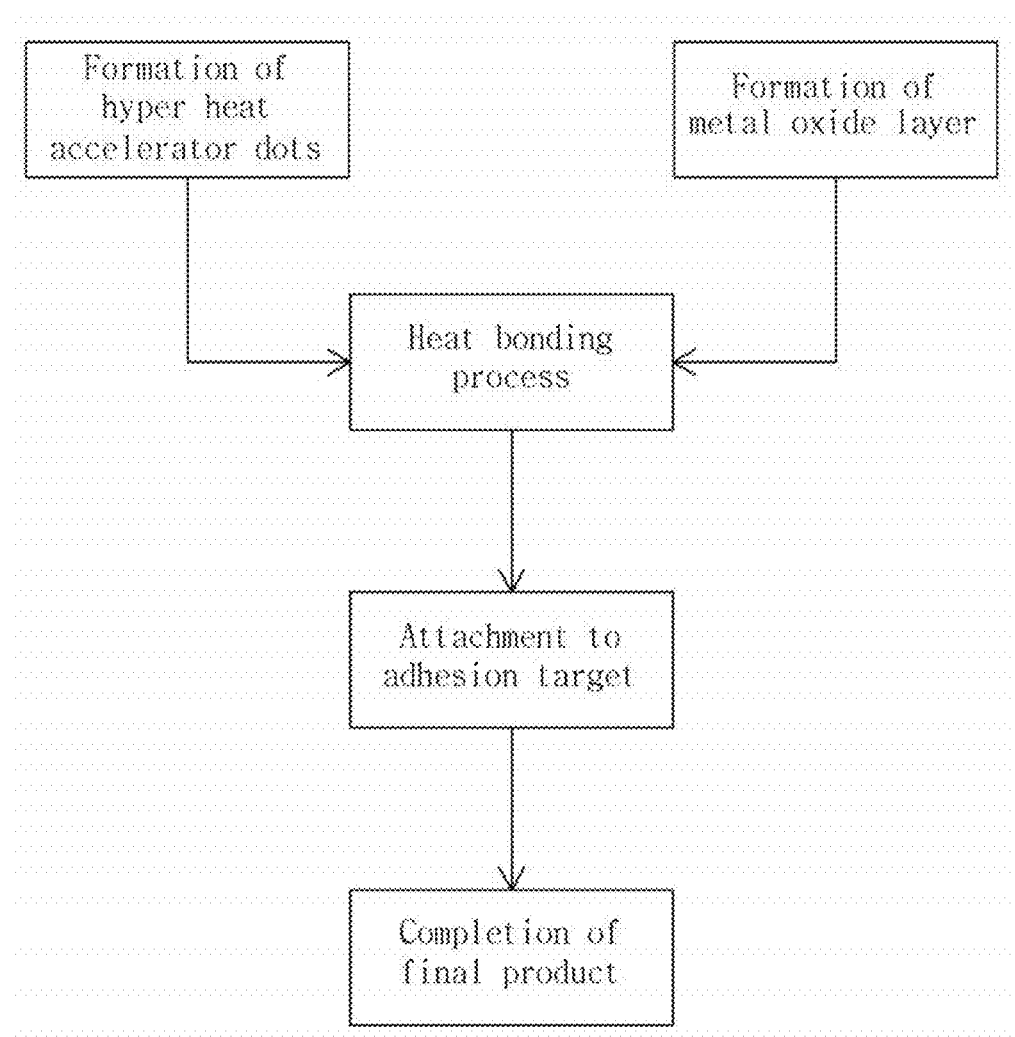
FIG. 5 is a flowchart showing the process of manufacturing a heating device according to an embodiment of the present disclosure.
Figure 8:
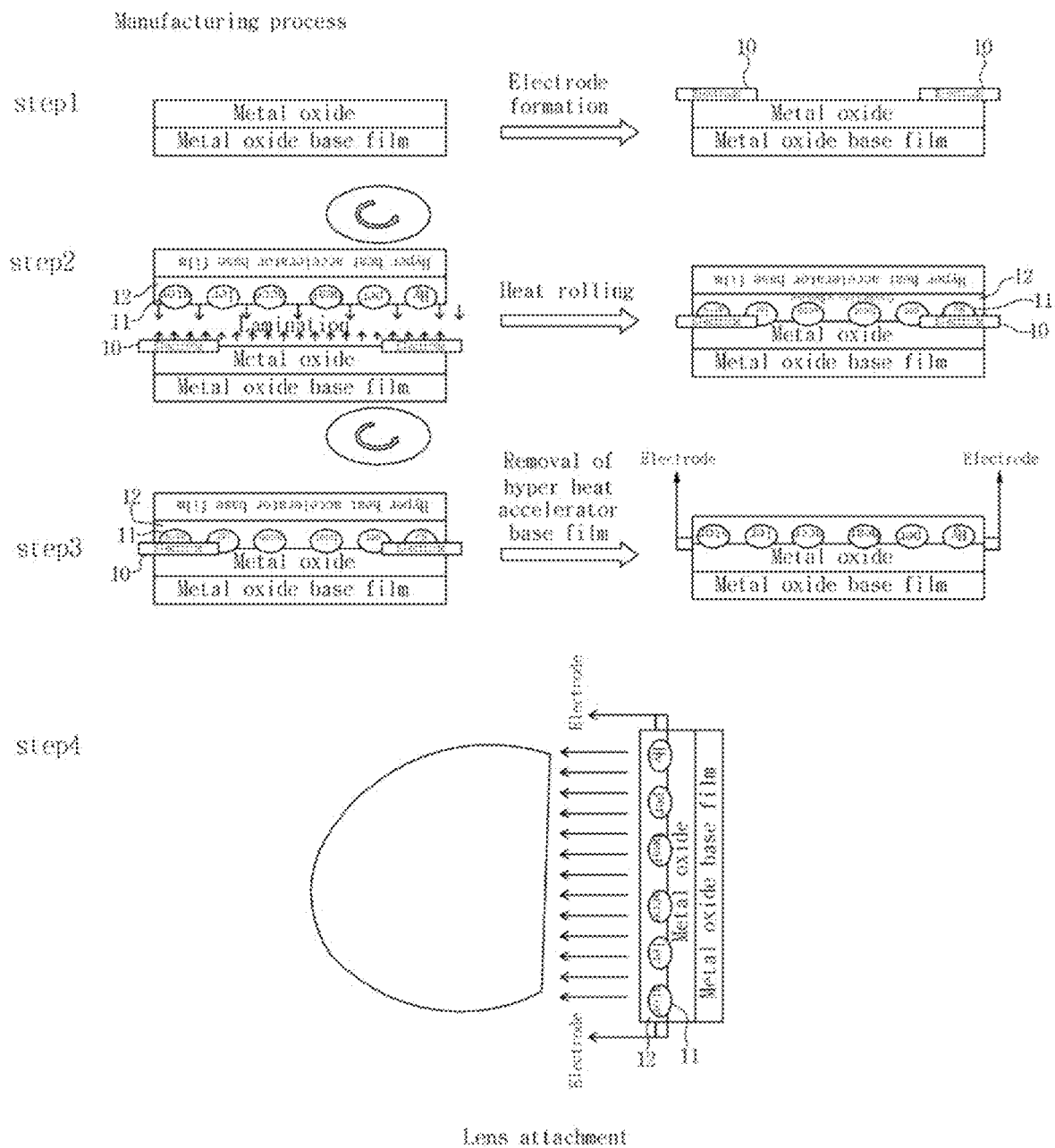
FIG. 8 shows the steps for manufacturing the heating device according to an embodiment of the present disclosure and the products in individual steps.

FIG. 5 is a flowchart showing the process of manufacturing the heating device according to the present disclosure. FIG. 8 shows the products obtained in individual steps of FIG. 5.

<Formation of Hyper Heat Accelerator Dots>

According to the present disclosure, hyper heat accelerator dots having a spherical shape may be formed on an adhesive layer through a continuous room-temperature chemical process.

In an embodiment of the present disclosure, the continuous room-temperature chemical process includes: guiding microwaves generated from a microwave generator to a magnetic field formation space; introducing a plasma source gas into the magnetic field formation space; maintaining the plasma source gas in the magnetic field formation space in a plasma state through exposure to the microwaves; maintaining plasma having high energy density through ECR (Electro Cyclotron Resonance) of electrons and ions in the plasma under a magnetic field; feeding a hyper heat accelerator source gas for forming a deposition film into the plasma region having high energy density to give activated ions; and continuously forming (depositing) hyper heat accelerator dots through instant surface chemical reaction of the activated ions on the surface of the adhesive layer.

The continuous room-temperature chemical process according to the present disclosure is capable of forming hyper heat accelerator dots in a lattice arrangement and uniform distribution, compared to a sputtering process for forming dispersive nanodots.

The hyper heat accelerator dots may have a diameter ranging from 50 to 100 nm, for example, 50 to 90 nm, 50 to 80 nm, 50 to 70 nm, 50 to 60 nm, 60 to 100 nm, 60 to 90 nm, 60 to 80 nm, 60 to 70 nm, 70 to 100 nm, 70 to 90 nm, 70 to 80 nm, 80 to 100 nm, 80 to 90 nm, and all ranges and sub-ranges therebetween. If the diameter thereof falls outside of the appropriate range, structural stability may decrease and thus heat acceleration characteristics may deteriorate.

The hyper heat accelerator dots may be arranged at an interval ranging from 10 to 20 nm, for example, 10 to 15 nm, 10 to 13 nm, 15 to 20 nm, 18 to 20 nm, and all ranges and sub-ranges therebetween. If the interval therebetween is less than 10 nm, optical properties may decrease. On the other hand, if the interval therebetween exceeds 20 nm, optical properties may become good but heat storage properties may deteriorate, thus reducing heat acceleration performance.

Figure 6:
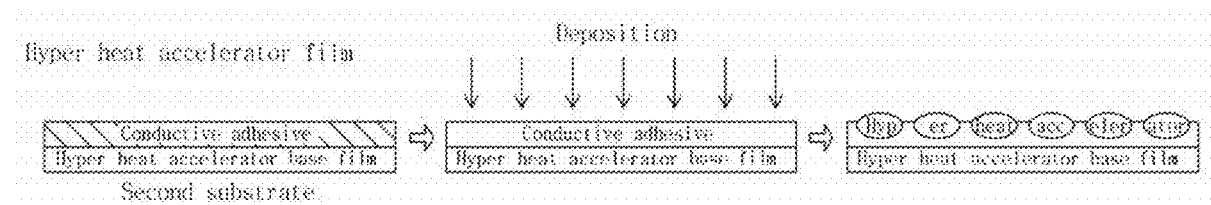
FIG. 6 shows the formation of a hyper heat accelerator on a second substrate according to an embodiment of the present disclosure.

FIG. 6 shows the formation of the hyper heat accelerator on the second substrate according to an embodiment of the present disclosure. As shown in FIG. 6, the second substrate may be an adhesive film configured such that a conductive adhesive is formed on a base film. With reference to FIG. 6, the hyper heat accelerator dot layer may be formed on the conductive adhesive layer of the adhesive film (second substrate).

In an exemplary embodiment, the conductive adhesive may be of a cured type, and a conductive metal such as Ni, Ag, or Ni/Au may be included in the surface of the insulating silicon-based polymer particles.

During the subsequent processing, the hyper heat accelerator film may be attached via lamination to a metal composite oxide film configured such that a metal oxide layer is formed on the electrodes and the first substrate. Thereafter, the hyper heat accelerator base film of the hyper heat accelerator film layer may be removed from the conductive adhesive layer through a roll-rewinding process. Here, the film removal process is not limited to the roll-rewinding process, but any process may be performed, so long as it is known in the art.

<Formation of Metal Oxide Layer>

Figure 7:
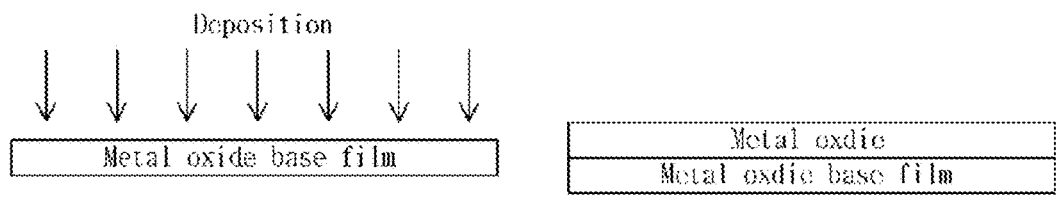
FIG. 7 shows the formation of a metal oxide layer on a metal oxide base film (a first substrate) according to an embodiment of the present disclosure.

FIG. 7 shows the formation of the metal oxide layer on the metal oxide base film (first substrate) according to an embodiment of the present disclosure. With reference to FIG. 7, the metal oxide layer may be formed by depositing metal oxide on the first substrate. The deposition is performed at room temperature, and a chemical vapor deposition process may be used, but the disclosure is not limited thereto, and any known vapor deposition process may be employed. Specifically, the chemical vapor deposition process may be conducted in a manner in which over-condensed metal ions are formed by applying a voltage to a metal oxide precursor and the formed metal ions are deposited on the surface of the substrate through chemical bonding. Since the chemical vapor deposition process is performed at room temperature, deposition onto a polymer that has high functionality but is poorly resistant to heat becomes possible, and the above deposition process facilitates large-area deposition.

After the deposition of the metal oxide layer, an electrode formation process and a lamination process with the hyper heat accelerator film are performed.

<Heat Bonding Process>

FIG. 8 shows the lamination attachment of the hyper heat accelerator formed on the second substrate onto the metal oxide layer of the first substrate, and the steps for manufacturing the heating device according to an embodiment of the present disclosure and the products in individual steps.

With reference to FIG. 8, the second substrate having the hyper heat accelerator dots having a spherical shape formed thereon and the first substrate having the metal oxide layer formed thereon are passed through a roller, whereby the hyper heat accelerator dots having a spherical shape are attached via lamination to the metal oxide layer while remaining attached to the second substrate, thus manufacturing the heating device. Through the lamination attachment, the lower portions of the hyper heat accelerator dots having a spherical shape may be included in the metal oxide layer, and the upper portions thereof may be included in the conductive adhesive layer.

During the lamination attachment of the hyper heat accelerator dots, the roller may be used at a pressure of 1 to 5 kg/cm$^2$, 1 to 4 kg/cm$^2$, 1 to 3 kg/cm$^2$, 1 to 2 kg/cm$^2$, 2 to 6 kg/cm$^2$, 2 to 5 kg/cm$^2$, 2 to 4 kg/cm$^2$, 2 to 3 kg/cm$^2$, 3 to 5 kg/cm$^2$, 3 to 4 kg/cm$^2$, 4 to 5 kg/cm$^2$, and all ranges and sub-ranges therebetween.

During the lamination attachment of the hyper heat accelerator dots, the roller may be used at a temperature of 60 to 80° C., 60 to 75° C., 60 to 70° C., 60 to 65° C., 65 to 80° C., 65 to 75° C., 65 to 70° C., 70 to 80° C., 70 to 75° C., 75 to 80° C., and all ranges and sub-ranges therebetween.

If the pressure is less than 1 kg/cm$^2$ and the temperature is lower than 60° C., the roller cannot exhibit energy necessary for diffusing the hyper heat accelerator dots into the metal oxide layer, thus reducing the diffusion of the hyper heat accelerator dots into the metal oxide layer, thereby decreasing the heat value of the heating device.

On the other hand, if the pressure is greater than 5 kg/cm$^2$ and the temperature is higher than 80° C., the diffusion of the hyper heat accelerator dots into the metal oxide layer cannot be performed in a lattice structure, thus deteriorating the properties of the heating device.

<Attachment to Adhesion Target and Completion of Final Product>

Figure 9:
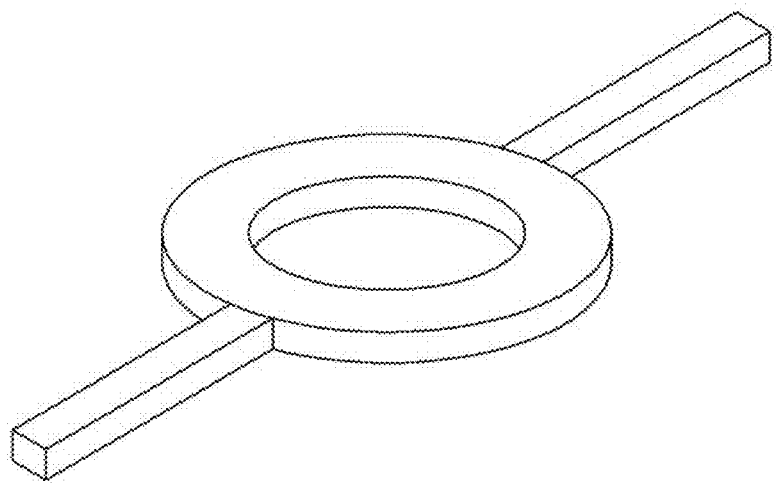
FIG. 9 is an image of a heating device for a camera lens according to an embodiment of the present disclosure.
Figure 10:
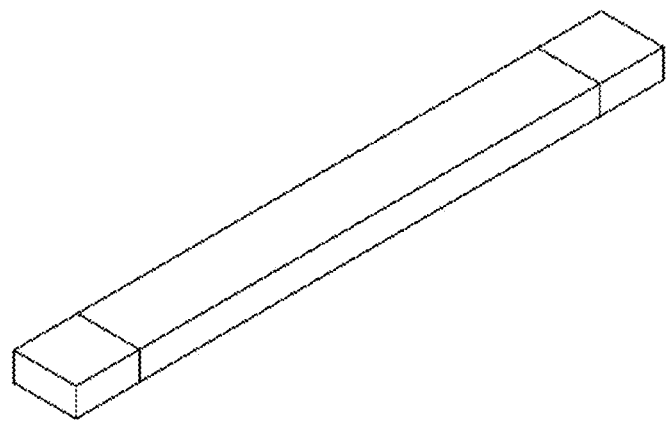
FIG. 10 is an image of a heating device for a camera lens according to another embodiment of the present disclosure.

FIGS. 9 and 10 show the images of the heating device for a camera lens according to embodiments of the present disclosure. FIG. 9 shows a normal type for direct attachment to a lens and FIG. 10 shows an assembly-ring type for indirectly applying heat to a lens through attachment to the outer rim of a camera lens module. The type of circular lens direct attachment shown in FIG. 9 and the type of assembly rim attachment shown in FIG. 10 are attached to different positions of a camera.

Figure 11:
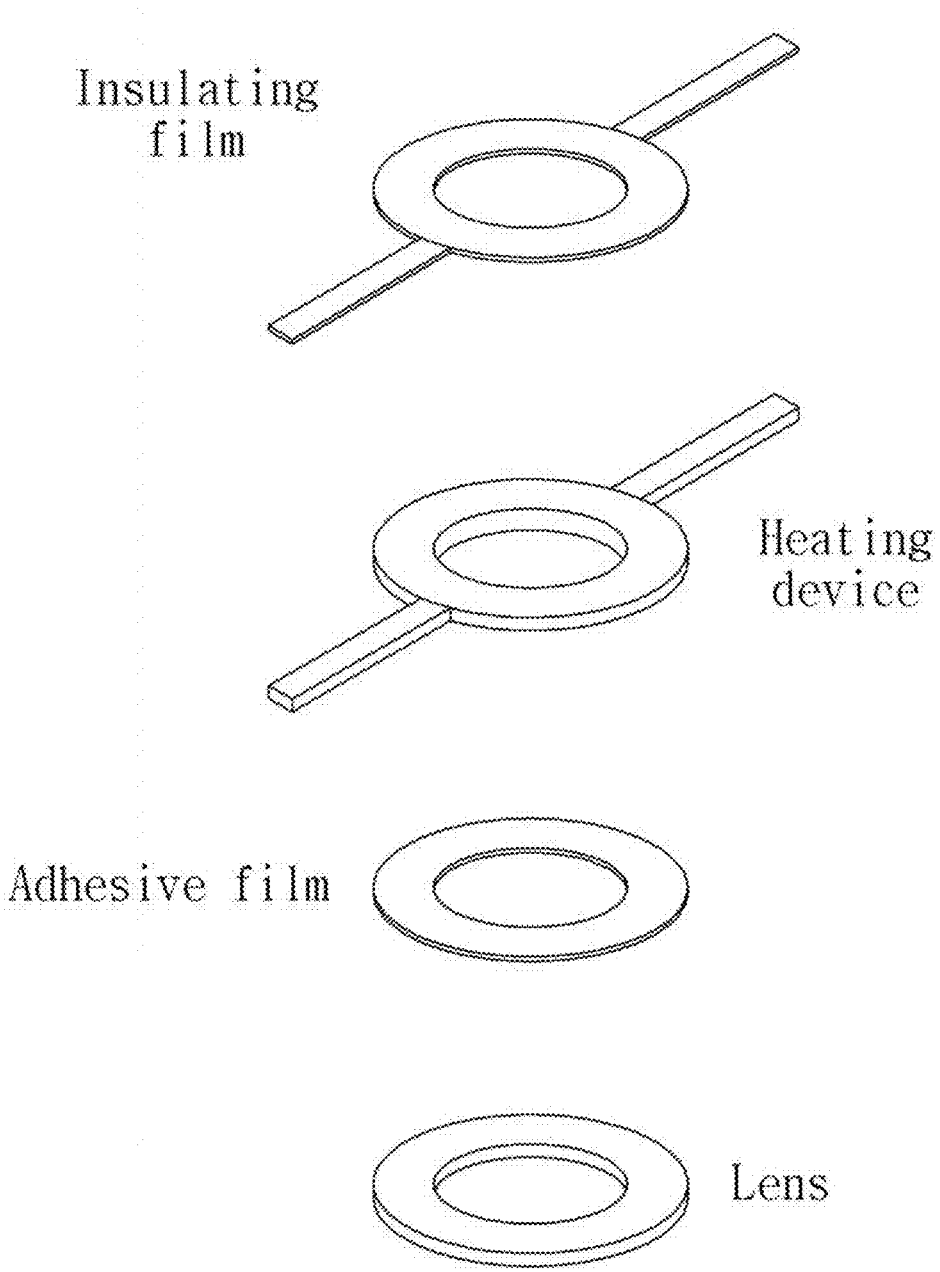
FIG. 11 shows a bonding structure of a heating device and a camera lens according to an embodiment of the present disclosure.

FIG. 11 shows the bonding structure of the normal-type heating device and the camera lens according to the present disclosure. The insulating film may be attached to the top of the heating device. The bottom of the heating device may be attached to the camera lens using a double-sided adhesive film.

Figure 12:
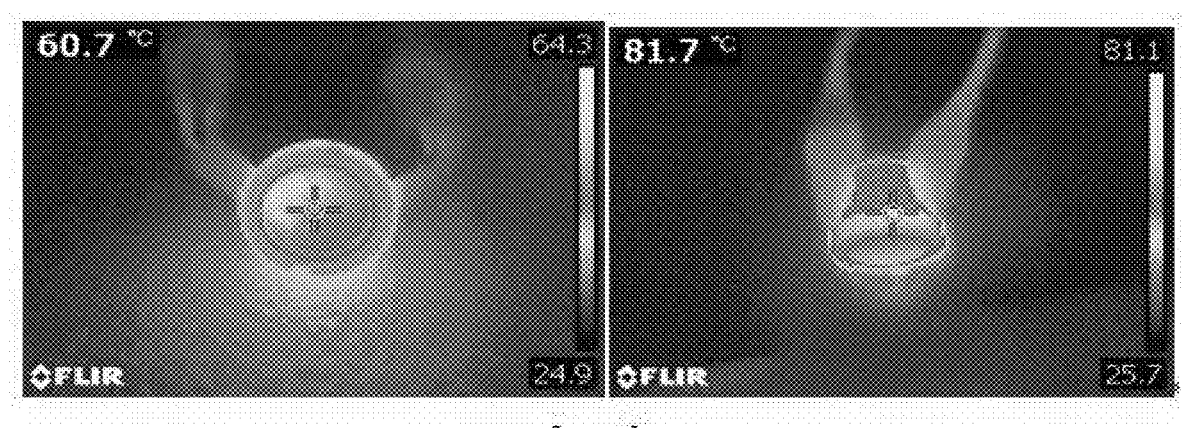
FIG. 12 shows images of a heating test performed after attachment of a heating device according to an embodiment of the present disclosure to a camera lens.

FIG. 12 shows images of the heating test after attachment of the heating device to the camera lens. The left of FIG. 12 shows the normal type attached to the lens and the right of FIG. 12 shows the assembly-ring type attached to the lens. A better understanding of the present disclosure will be given of the following examples, which are merely set forth to illustrate but are not to be construed as limiting the scope of the present disclosure.

Example 1

FIG. 8 shows the steps for manufacturing the heating device according to an embodiment of the present disclosure and the products in individual steps.

A tin oxide layer was deposited through a chemical deposition process on a first PET substrate 1 having a thickness of about 150 μm. Separately, hyper heat accelerator dots composed of SnF$_2$ were deposited on a second PET substrate 2 having a thickness of about 150 μm using a continuous room-temperature chemical process. With reference to FIG. 6, as the second substrate, an adhesive film configured such that a conductive adhesive layer was formed on both surfaces of a base film (a PET film) was used. The hyper heat accelerator dots were deposited on one surface of the conductive adhesive layer. Also, a protective film was attached in order to protect the hyper heat accelerator (dot) layer until completion of the process of lamination-attaching the hyper heat accelerator dots to the metal oxide layer.

Before the lamination process, the protective film was removed using a roll rewinder.

The adhesive layer (film) having the hyper heat accelerator dots formed thereon and the first PET substrate having the metal oxide layer formed thereon were passed through a roller, whereby the hyper heat accelerator dots were attached via lamination to the metal oxide layer while remaining attached to the adhesive layer, thus manufacturing a heating device. The roller was used at a pressure of about 3 kg/cm$^2$ and a temperature of about 70° C.

Also, heating devices were manufactured in the same manner as in Example 1 at different pressures of the roller.

The heat temperatures of the manufactured heating devices depending on changes in the pressure of the roller were measured. The results are shown in Table 1 below.

TABLE 1

| Pressure (kg/cm$^2$) | IV resistance (Ω) | Heat temperature (° C.), 12 V |
| --- | --- | --- |
| 0 | 149 | 93 |
| 0.5 | 141 | 110 |
| 1 | 136 | 112 |
| 3 | 130 | 115 |
| 5 | 130 | 114 |
| 7 | 136 | 100 |

IV resistance denotes the device resistance. IV resistance is a physical quantity that impedes the flow of current in a conductor. Basically, the bezel is positioned at both ends of the device, and the IV resistance value is measured depending on the distance between the two electrodes and the area and length of the heating film.

Comparative Example 1

A heating device was manufactured in the same manner as in Example 1, with the exception that the hyper heat accelerator dots composed of SnF$_2$ were not deposited.

The temperatures of the heating devices of Example 1 and Comparative Example 1 were measured over time. The results are shown in FIG. 4.

Example 2

The heating device manufactured in Example 1 was provided in the form of a normal-type heating device. The normal-type heating device has a ring suitable for covering a circular lens and two strips extending in opposite directions from the ring. Electrodes are formed at the ends of the two strips. FIG. 9 illustrates the normal-type heating device.

The heating device manufactured in Example 1 was provided in the form of an assembly-ring-type heating device. The assembly-ring-type heating device is a rectangular band. Electrodes are formed at both ends of the band. FIG. 10 illustrates the assembly-ring-type heating device.

The normal-type heating device and the assembly-ring-type heating device were attached to the camera lens. FIG. 11 is an exploded perspective view of a structure in which the normal-type heating device is attached to a camera lens. The adhesive film was attached on the camera lens and the no type heating device was attached thereon. The insulating film was attached on the heating device. Also, the assembly-ring-type heating device was attached to the camera lens in the same manner as above.

The heating device attached to the camera lens was subjected to a heating test. The results are shown in FIG. 12.

FIG. 12 represents images of the heating test conducted after attachment of the heating device to the camera lens. The heat temperature was determined depending on conditions such as applied voltage, device resistance, and the like.

Although the embodiments of the present disclosure have been disclosed for illustrative purposes, those skilled in the art will appreciate that various modifications, additions and substitutions are possible, without departing from the scope and spirit of the disclosure as disclosed in the accompanying claims.

Accordingly, simple modifications or variations of the present disclosure fall within the scope of the present disclosure as defined in the accompanying claims.

What is claimed is:

1. A heating device, comprising:
a substrate;
a metal oxide layer formed on the substrate;
hyper heat accelerator dots having a spherical shape, said heat accelerator dots distributed uniformly on the metal oxide layer in a lattice arrangement and at a distance from 10 nm to 20 nm relative to each other;
a conductive adhesive layer formed on the metal oxide layer and the hyper heat accelerator dots,
wherein lower portions of the hyper heat accelerator dots having a spherical shape are included in the metal oxide to thus form a diffusion layer and upper portions thereof are included in the conductive adhesive layer;
wherein an insulating film is attached to the top of the heating device and the bottom of the heating device is attached to a camera lens using a double-sided adhesive film.

2. The heating device of claim 1, wherein the hyper heat accelerator is selected from the group consisting of SnF$_2$, SnF$_4$, tin nickel fluoride (SnNiF), tin chromium fluoride (SnCrF), tin zinc fluoride (SnZnF), zinc nickel fluoride (ZnNiF) and combinations thereof.

3. The heating device of claim 1, wherein the hyper heat accelerator dots have a diameter of 50 to 100 nm and are arranged at an interval of 10 to 20 nm.

4. The heating device of claim 1, wherein the metal oxide is selected from the group consisting of aluminum oxide, copper oxide, iron oxide, tin oxide, cadmium oxide, zinc oxide and combinations thereof.

5. The heating device of claim 1, wherein the conductive adhesive is an optically clear adhesive.

6. The heating device of claim 1, wherein the metal oxide layer is formed thereon through a roller, whereby the hyper heat accelerator dots are attached via lamination to the metal oxide layer while remaining attached to the conductive adhesive layer, and
wherein, during the lamination attachment of the hyper heat accelerator dots, the roller is used at a predetermined pressure and a predetermined temperature.

7. The heating device of claim 6, wherein when the predetermined pressure is less than 1 kg/cm2 and the predetermined temperature is lower than 60° C., the roller cannot exhibit energy necessary for diffusing the hyper heat accelerator dots into the metal oxide layer, thus reducing the diffusion of the hyper heat accelerator dots into the metal oxide layer, thereby decreasing the heat value of the heating device, and
wherein, when the predetermined pressure is greater than 5 kg/cm2 and the predetermined temperature is higher than 80° C., the diffusion of the hyper heat accelerator dots into the metal oxide layer cannot be performed in a lattice structure, thus deteriorating the properties of the heating device.

\* \* \* \* \*